US009752696B2

(12) United States Patent
Smith

(10) Patent No.: US 9,752,696 B2
(45) Date of Patent: Sep. 5, 2017

(54) PRESSURE RELIEF SYSTEM AND METHOD

(71) Applicant: Strom W. Smith, Gulfport, MS (US)

(72) Inventor: Strom W. Smith, Gulfport, MS (US)

( * ) Notice: Subject to any disclaimer, the term of this patent is extended or adjusted under 35 U.S.C. 154(b) by 113 days.

(21) Appl. No.: 14/881,451

(22) Filed: Oct. 13, 2015

(65) Prior Publication Data
US 2016/0102772 A1 Apr. 14, 2016

Related U.S. Application Data

(60) Provisional application No. 62/063,029, filed on Oct. 13, 2014.

(51) Int. Cl.
*F16K 15/02* (2006.01)
*F16K 27/02* (2006.01)
*F16K 49/00* (2006.01)
*F16K 17/02* (2006.01)

(52) U.S. Cl.
CPC .......... *F16K 27/0209* (2013.01); *F16K 17/02* (2013.01); *F16K 49/005* (2013.01)

(58) Field of Classification Search
CPC .... F16K 27/0209; F16K 17/02; F16K 49/005; Y10T 137/2012
USPC ...................... 137/514, 514.3, 528, 535, 540
See application file for complete search history.

(56) References Cited

U.S. PATENT DOCUMENTS 2,092,793 A * 9/1937 Abercrombie .......... F16K 17/14
137/514
4,121,619 A * 10/1978 Pauliukonis ............ F16K 1/385
137/469

\* cited by examiner

*Primary Examiner* — Craig Schneider
*Assistant Examiner* — P. Macade Nichols
(74) *Attorney, Agent, or Firm* — Keeling Law, LLC; Kenneth A. Keeling; Mark S. Solomon

(57) ABSTRACT

Embodiments of the present invention generally include a pressure relief system and methods of use, in which an apparatus includes an upper chamber fluidly connected to a pressurized fluid source, a lower chamber having an inlet and an outlet, a vertically moveable plate intermediate the chambers and disposed within a plate support, and connected to the plate by a vertical shaft, a vertically actuating lower chamber inlet valve including an inlet seal. Pressure relief is accomplished by controlling fluid pressure in the upper chamber such that varying downward force on the plate and therefore, via the shaft, the inlet seal, allows for selective opening/closing of the inlet valve as a function of upper chamber fluid pressure relative to the pressure exerted from a fluid source for which pressure relief is desired, beneath the inlet seal, whereby over-pressured fluid entering the lower chamber via the inlet is vented out the outlet.

18 Claims, 2 Drawing Sheets

PRESSURE RELIEF SYSTEM AND METHOD

CROSS-REFERENCE TO RELATED APPLICATIONS

This application claims the benefit of U.S. Provisional Application No. 62/063,029 filed on Oct. 13, 2014, which application is incorporated herein by reference as if reproduced in full below.

STATEMENT REGARDING FEDERALLY SPONSORED RESEARCH OR DEVELOPMENT

Not Applicable.

BACKGROUND OF THE INVENTION

Field of the Invention

The present invention relates to pressure regulators for fluids. More particularly, the present invention provides a pressure relief valve controlling flow of fluids in an industrial application such as a sulfur trap.

Description of the Related Art

Pressure relief valves are widely used in all types of industry where protection against over-pressurization of fluids is desirable. Pressure relief valves for large applications, such as industrial applications and sulfur trap pressure relief valves, are commonly rupture release systems that cannot reseal themselves. While other pressure relief valves are designed to be self-resealing, many resealing pressure relief valves in the prior art utilize metallic springs in their operation. A disadvantage with these relief valves is that the springs weaken with age. The weakened spring jeopardizes the accuracy and reliable operation of the relief valve. Other presently available pressure relief valves utilize flexible diaphragms or discs in their operation. A disadvantage with these relief valves is that the diaphragms tend to lose their flexibility with age, and can rupture without warning. In that event, the valve may provide no protection at all from over-pressurization of the fluid.

A need therefore exists for a pressure relief valve that is self-resealing but does not utilize springs or flexible diaphragms for its operation. It is also desirable that the relief valve will be capable of being tested without its disconnection or removal from its service position.

BRIEF SUMMARY OF THE INVENTION

The present invention is a pressure relief system and method. According to one embodiment of the invention, there is provided a pressure relief system which comprises an apparatus that includes an upper chamber and a lower chamber. The lower chamber comprises a fluid inlet, which is selectively openable/closeable by manipulation of a vertically moveable seal component, and a fluid outlet. The inlet is fluidly connected to a process fluid for which pressure relief protection is desired. The outlet is fluidly connected to any process location to which over-pressure process fluid may be directed. In this embodiment, a vertically moveable plate is disposed between the two chambers and is connected to the seal component. Pressure applied to the upper surface of the plate provides controllable resistance to opening of the seal, which allows for control of the fluid pressure at which the seal is moveable to provide the desired pressure relief. Other features and advantages of the invention will be apparent from the following description, the accompanying drawings, and the appended claims.

BRIEF DESCRIPTION OF THE DRAWINGS

For a more complete understanding of the present invention and the advantages thereof, reference is now made to the following Detailed Description of Exemplary Embodiments of the Invention, taken in conjunction with the accompanying drawings, in which.

DETAILED DESCRIPTION OF EXEMPLARY EMBODIMENTS OF THE INVENTION

As used herein, the terms up, upward, upper, down, downward, lower, and like directional indications are for descriptive reference only as the system is operable in various orientations.

Figure 1:
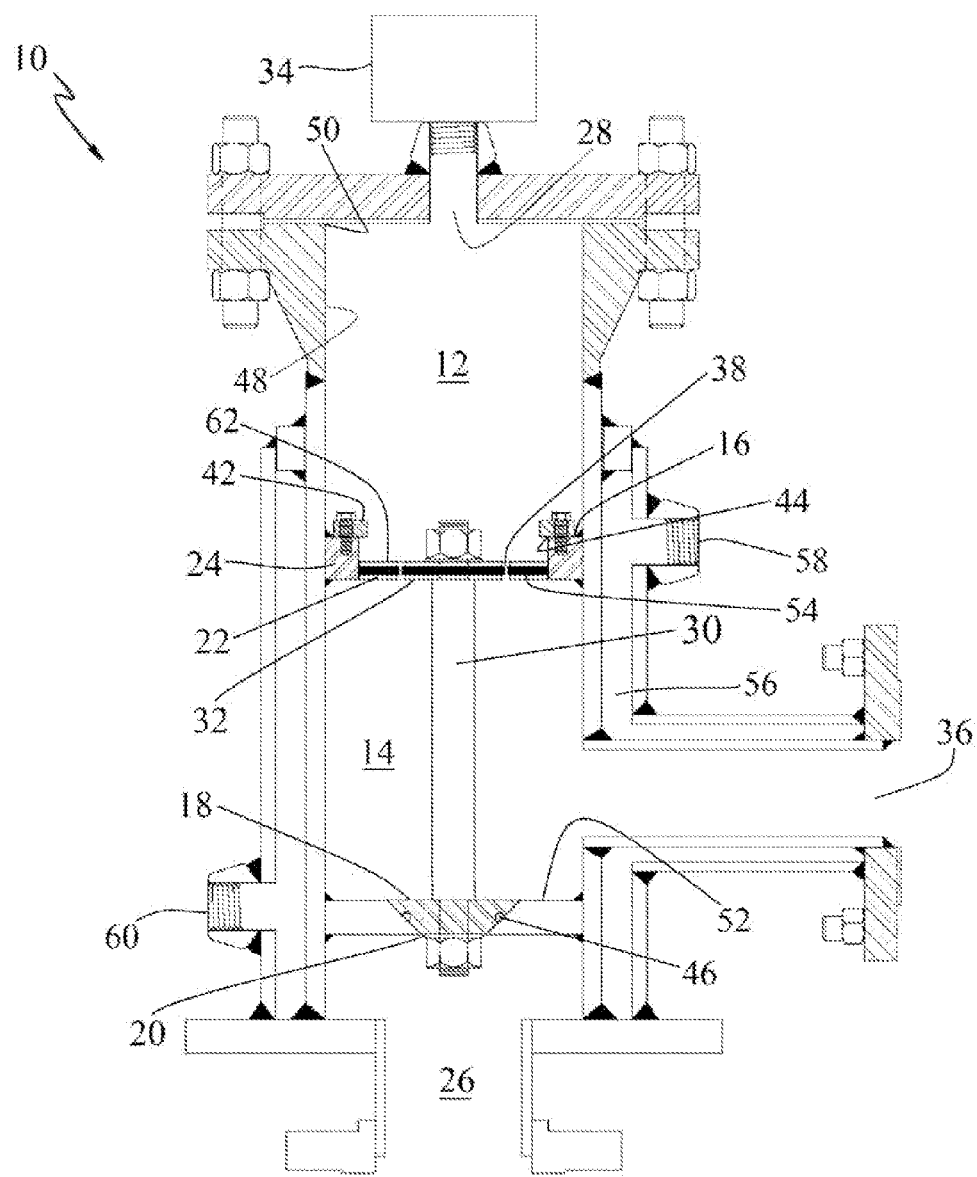
FIG. 1 is a cross-sectional view of an embodiment of a pressure relief system of the present invention with the lower chamber inlet valve closed.

Referring to the attached FIG. 1, an embodiment of a pressure relief system 10 for use in a fluid system, the fluid system including without limitation gas mixtures and liquid-gas mixtures, is depicted. In this embodiment, the pressure relief system 10 includes a sealed upper chamber 12 and a sealed lower chamber 14. A plate 22 is positioned between upper chamber 12 and lower chamber 14. In one embodiment, plate 22 is vertically moveable within a plate support 24. In one embodiment, plate 22 comprises a substantially circular component having a circular edge adapted and configured to at least partially engage plate support 24.

In one embodiment, one or more substantially annular o-rings 54 are disposed circumferentially around the circular edge of plate 22. Plate 22 may comprise a channel (not shown) within its circular edge to accommodate an o-ring 54. As would be understood by one skilled in the art, an o-ring 54 may comprise any suitable material, such as but not limited to, an elastomer. In one embodiment, o-ring 54 comprises a fluoroelastomer comprising tetrafluoroethylene and propylene (TFE/P), available from AGC Chemicals Americas, Inc. under the tradename AFLAS®.

Plate support 24 may be provided to ensure a direct up and down movement of plate 22. In one embodiment, plate support 24 comprises a substantially annular component circumferentially disposed within upper chamber 12. Plate support 24 may be affixed to the inner surface 48 of upper chamber 12, or may be provided integral thereto. In one embodiment, plate 22 and plate support 24 divide upper chamber 12 from lower chamber 14.

In one embodiment, one or more stops 42 are provided within upper chamber 12 to prevent upward movement of plate 22 there beyond. In the embodiment shown in FIG. 1, stop 42 is employed to limit upward movement of plate 22 beyond an upper end 44 of plate support 24. In one embodiment, the total vertical movement of plate 22 is limited by stop 42 to about one inch. In one embodiment, stop 42 comprises a substantially annular component circumferentially disposed within upper chamber 12 and contacting upper surface 44 of plate support 24. In the embodiment shown in FIG. 1, stop 42 is affixed to plate support 24, while in other embodiments (not shown), stop 42 is affixed to or integral with inner surface 48 of upper chamber 12.

In one embodiment (not shown), plate 22 is sized and configured to be disposed within upper chamber 12 without need for a plate support 24. In such an embodiment, plate 22 is vertically moveable within upper chamber 12, whereby the interior surface 48 of upper chamber 12 provides support for plate 22. In such an embodiment, one or more stops 42 may be provided between the upper surface 62 of plate 22 and the upper end 50 of upper chamber 12. In such an embodiment, one or more stops 42, if employed, may be affixed to the interior surface 48 of upper chamber 12 or integral thereto.

In one embodiment, plate 22, in combination with plate support 24, substantially prevents fluid flow between upper chamber 12 and lower chamber 14. In one embodiment, plate 22 comprises one or more orifices (weep holes) 38, which allow for fluid flow between upper chamber 12 and lower chamber 14. The number and dimensions of orifices 38 may be varied to accomplish a determined limitation of flow between upper chamber 12 and lower chamber 14 through plate 22. In one embodiment, the orifices 38 allow a small volume of fluid from fluid pressure source 34 to continuously purge the lower chamber 14.

In one embodiment, lower chamber 14 comprises an inlet opening 20 and an outlet opening 36. An inlet seal 18 is provided in lower chamber 14. Inlet seal 18 is connected to plate 22 by a shaft 30. Shaft 30 may comprise any suitable material, as would be understood by one skilled in the art. In one embodiment, shaft 30 comprises chrome. Although the embodiment shown in FIG. 1 depicts shaft 30 extending through inlet seal 18 and connection of inlet seal 18 to shaft 30 utilizing a threaded connection beneath inlet seal 18, the invention is not so limited and other connection geometries and mechanisms may be employed, as would be understood by one skilled in the art. In one embodiment (not shown), inlet seal 18 may comprise a threaded internal bore which may be utilized to connect a shaft 30 comprising threading external thereto. In another embodiment (not shown), inlet seal 18 may be integral to shaft 30. In addition, although the embodiment shown in FIG. 1 depicts shaft 30 extending through plate 24 and connection of plate 22 to shaft 30 utilizing a threaded connection above plate 22, the invention is not so limited and other connection geometries and mechanisms may be employed, as would be understood by one skilled in the art. In one embodiment (not shown), plate 22 may comprise a threaded internal bore which may be utilized to connect a shaft 30 comprising threading external thereto. In another embodiment (not shown), plate 22 may be integral to shaft 30.

Inlet seal 18, in combination with inlet opening 20, provides an inlet valve adapted to control fluid flow into lower chamber 14 via inlet opening 20. Shaft 30 maintains fixed spacing between upper plate 22 and inlet seal 18. In one embodiment, inlet opening 20 comprises a beveled surface 40. In one embodiment, inlet seal 18 comprises a conically shaped exterior surface adapted to sealingly engage beveled surface 40. Although the embodiment depicted in FIG. 1 comprises an inlet seal 18 configured to fit substantially within inlet opening 20, the invention is not so limited and other geometries may be employed. For example, in one embodiment (not shown), inlet seal 18 may comprise a substantially flat bottom surface having dimensions greater than the cross-sectional area of inlet 20, whereby the bottom surface of inlet seal 18 is configured and adapted to contact the internal bottom surface 52 of lower chamber 14 to seal inlet 20.

In one embodiment, inlet seal 18 comprises one or more o-rings 46 to facilitate provision of a fluid seal between inlet seal 18 and inlet opening 20. In one embodiment, o-ring 46 may be provided at least partially within a channel (not shown) circumferentially disposed on the exterior surface of inlet seal 18. As would be understood by one skilled in the art, an o-ring 46 may comprise any suitable material, such as but not limited to, an elastomer. In one embodiment, o-ring 46 comprises a fluoroelastomer comprising tetrafluoroethylene and propylene (TFE/P), available from AGC Chemicals Americas, Inc. under the tradename AFLAS®.

Upper chamber 12 has at least one inlet opening 28. In one embodiment, an inlet opening 28 is connected to a pressure source 34. Pressure source 34 is operable to provide fluid to maintain a predetermined pressure or pressure range within upper chamber 12.

Upper plate 22 has a lower surface 32 exposed to the interior of lower chamber 14. In one embodiment, the surface area of lower surface 32 is greater than the cross-sectional area of lower chamber 14 inlet 20.

Figure 2:
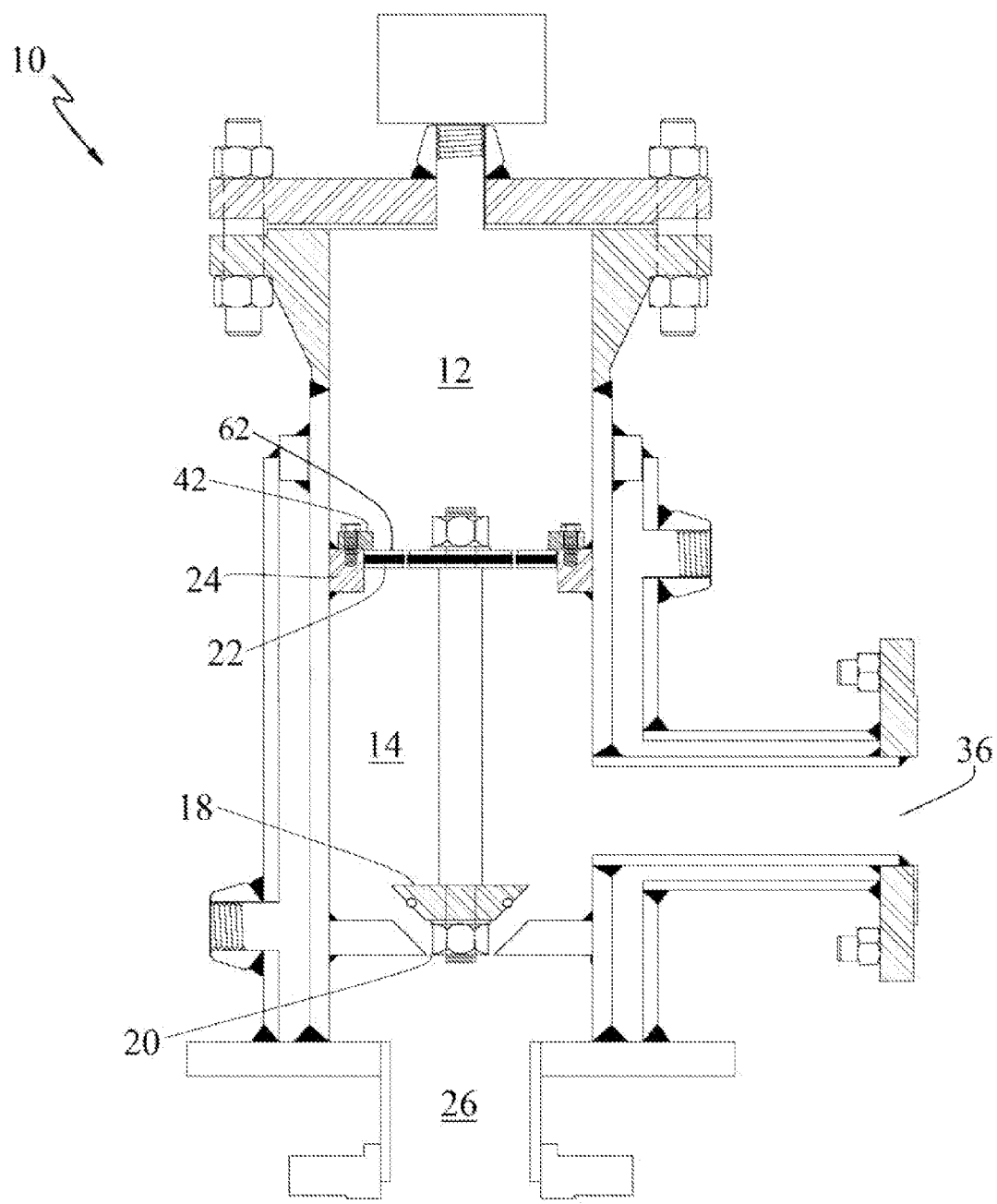
FIG. 2 is a cross-sectional view of an embodiment of a pressure relief system of the present invention with the lower chamber inlet valve open.

In an exemplary embodiment, lower chamber inlet opening 20 is fluidly connected to a process vessel, such as a pipe or chamber 26, containing a fluid (not shown). As upper plate 22 and inlet seal 18 are connected with a fixed distance there between, and the pressure within upper chamber 12 can be controlled, movement of inlet seal 18 may be controlled by controlling pressure within upper chamber 12 in relation to the pressure in pipe/chamber 26. Pressure in upper chamber 12 is controlled to allow pressure release of fluid within pipe/chamber 26 through lower chamber 14 by means of inlet opening 20 and outlet opening 36. Such control is accomplished by providing a desired fluid pressure within upper chamber 12. When fluid pressure within pipe/chamber 26 at inlet opening 20 exceeds a determined level, inlet seal 18 is forced upward, thereby biasing plate 22 upward toward upper end 50 of upper chamber 12, as depicted in FIG. 2. As shown in FIG. 2, upward movement of inlet seal 18 unseals inlet opening 20, thereby allowing fluid from pipe/chamber 26 to flow there through. Fluid entering lower chamber 14 through inlet 20 flows out through outlet 36. Upon diminishment of fluid pressure within pipe/chamber 26 at inlet 20 to a level at or below the determined level, fluid pressure within upper chamber 12 biases plate 22 downward toward lower chamber 14, thereby biasing inlet seal 18 back into sealing engagement with inlet 20.

In one embodiment, pressure relief system 10 comprises a temperature control system comprising a sealed jacket component 56. The temperature control system may be adapted and configured to provide and/or maintain fluid disposed within upper chamber 12, lower chamber 14, and/or pipe/channel 26 in a liquid or gaseous state. In one aspect, this would include providing/maintaining a low melting temperature material, such as sulfur, in a molten state. In one embodiment, jacket 56 comprises a substantially hollow, sealed component adapted and configured to contain a fluid for heating and/or cooling of at least a portion of upper chamber 12, lower chamber 14, and/or pipe/channel 26. In one embodiment, jacket 56 is adapted and configured to accommodate fluid flow there through via introduction of the temperature controlling fluid (not shown) into jacket 56 through jacket inlet 58, and outflow of the temperature controlling fluid through outlet 60. In one embodiment, the temperature controlling fluid is low-pressure steam. As one skilled in the art would understand, in an embodiment where low-pressure steam is introduced via jacket inlet 58, the fluid exiting jacket outlet 60 may comprise steam condensate.

Additional components (not shown) may be employed to control, for example, flow rate, temperature, pressure, etc. of the temperature controlling fluid. In the embodiment shown in FIG. 1, jacket 56 is depicted as a single component disposed circumferentially external to portions of upper chamber 12, lower chamber 14, and pipe/channel 26, although the invention is not so limited and other arrangements are possible. In one embodiment, a plurality of jackets 56 is employed, whereby different components of pressure relief system 10 can be provided/maintained at different temperatures. In other embodiments of the temperature control system, jacket 56 may be replaced with, our augmented by, one or more additional components (not shown), such as steam or impedance heat tracing, or other heating/cooling mechanisms as would be appreciated by one skilled in the art.

Method

A method of operating a pressure relief system of the present invention comprises the following steps:

Providing an apparatus comprising a lower chamber having a lower chamber inlet opening, the inlet opening in fluid communication with a fluid source; an outlet opening; and an upper chamber having an upper chamber inlet opening, the upper chamber inlet opening in fluid communication with a pressurized fluid source;

Providing a vertically moveable plate intermediate the lower chamber and the upper chamber, and a connector, such as a solid shaft, between the plate and a sealing component at the lower chamber inlet opening, to maintain fixed spacing of the upper plate and the sealing component, the plate vertically moveable in response to pressure differentials between provided fluid pressure in the upper chamber and pressure external to the lower chamber inlet opening from a fluid source there disposed;

Operating the pressurized fluid source to provide a controlled pressure in the upper chamber, to allow opening of the valve comprising the combination of the lower chamber inlet and the sealing component above a determined pressure of the fluid source external thereto, and closing of the valve when the pressure of the external fluid source is at or below the determined pressure.

Operation

The following general description of operation of embodiments of the pressure relief system and method of the present invention is presented and is complementary to the foregoing description:

In one embodiment, pressurized fluid source 34 supplies to top chamber 12 a nitrogen or instrument air pad. The gas pressure may be supplied through a small instrument back pressure regulator (not shown). In one embodiment, the set pressure in upper chamber 12 is based on the ratio of the cross-sectional area of plate 22 and the cross-sectional area of inlet 20. For example; if the design pressure for relief is 20 psig, inlet 20 has a diameter of 4 inches, and the plate 22 has a diameter of 6 inches, then nitrogen/instrument air pressure source would be controlled to provide an upper chamber 12 pressure of about 9 psig.

At any time the pressure of the fluid for which pressure relief is desired is below the 20 psig relief point, the pressure in the upper chamber 12 would maintain a downward force on the plate 22, and hence the shaft 30, to maintain the inlet seal 18 in sealing engagement with the inlet 20, thereby preventing flow of the fluid through the inlet 20.

If the pressure exceeds the 20 psig set point, then the inlet seal 18 (as well as the shaft 30 and the plate 22) would move upward, thereby allowing fluid to flow through the inlet 20 and the fluid over-pressure to be relieved. Once the fluid pressure drops below the 20 psig, the pressure in the upper chamber 12 will force the inlet valve to close, preventing additional pressure relief.

The volume of over-pressure fluid that can be vented through lower chamber 14 is in part dependent on the total available area for relief. The total relief area is dependent on the dimensions of the inlet seal 18 in relation to inlet opening 20, and vertical movement of inlet seal 18 during a pressure relief event.

Testing of the relief valve can be accomplished by providing fluid of a known pressure to pipe chamber 26 and determining, either by visual observation of automated means, that fluid has been communicated through lower chamber 14 and through outlet opening 36. This testing can accomplished without having to disconnect, disassemble, or take off-line pressure relief system 10.

Variations or modifications of embodiments of the apparatus and method of the present invention are contemplated in accordance with the teachings provided herein and the general skill in the art. While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention. The extent and scope of the invention is set forth in the appended claims and is intended to extend to equivalents thereof.

I claim:

1. A pressure relief system comprising:
   an upper chamber;
   a lower chamber;
   a plate;
   a shaft; and
   an inlet seal;
   wherein:
      said upper chamber is fluidly connectable to a pressurized fluid source;
      said lower chamber comprises an inlet and an outlet;
      said plate is vertically moveable and is disposed between said upper chamber and said lower chamber;
      said shaft connects said plate to said inlet seal and provides a fixed distance there between;
      said inlet seal comprises a substantially conically shaped exterior surface and said inlet comprises a beveled surface;
      positioning of said inlet seal in a lowest position provides sealing engagement of said inlet seal with said inlet;
      internal fluid pressure within said upper chamber biases said plate, and therefore said inlet seal, via said shaft, downward;
      upward vertical movement of said inlet seal from said lowest position disengages said inlet seal from sealing engagement thereof with said inlet; and
      external fluid pressure sufficient to cause upward vertical movement of said inlet seal and disengage said inlet seal from said inlet provides for relief of said external fluid pressure via said inlet through said lower chamber outlet.

2. The apparatus of claim 1, wherein:
   said plate is disposed within a plate support.

3. The apparatus of claim 2, wherein:
said plate support comprises a stop adapted to limit upward vertical movement of said plate.
4. The apparatus of claim 1, wherein:
at least one of said plate and said inlet seal comprises an o-ring.
5. The apparatus of claim 1, wherein:
said plate comprises one or more orifices.
6. The apparatus of claim 1, further comprising:
a temperature control system.
7. The apparatus of claim 6, wherein:
said temperature control system comprises a steam jacket.
8. A pressure relief system comprising:
an upper chamber;
a lower chamber;
a plate;
a plate support;
a shaft; and
an inlet seal;
wherein:
  said upper chamber is fluidly connectable to a pressurized fluid source;
  said lower chamber comprises an inlet and an outlet;
  said plate is vertically moveable within said plate support and is disposed between said upper chamber and said lower chamber;
  said shaft connects said plate to said inlet seal and provides a fixed distance there between;
  said inlet seal comprises a substantially conically shaped exterior surface;
  said inlet comprises a beveled surface;
  positioning of said inlet seal within said inlet in a lowest position provides sealing engagement of said inlet seal with said inlet;
  internal fluid pressure within said upper chamber biases said plate, and therefore said inlet seal, via said shaft, downward;
  upward vertical movement of said inlet seal from said lowest position disengages said inlet seal from sealing engagement thereof with said inlet; and
  external fluid pressure sufficient to cause upward vertical movement of said inlet seal and disengage said inlet seal from said inlet provides for relief of said external fluid pressure via said inlet through said lower chamber outlet.
9. The apparatus of claim 8, wherein:
said plate support comprises a stop adapted to limit upward vertical movement of said plate.
10. The apparatus of claim 8, wherein:
at least one of said plate and said inlet seal comprises an o-ring.
11. The apparatus of claim 8, wherein:
said plate comprises one or more orifices.
12. The apparatus of claim 8, further comprising:
a temperature control system.
13. The apparatus of claim 12, wherein:
said temperature control system comprises a steam jacket.
14. A method of relieving fluid pressure comprising:
providing an apparatus comprising:
an upper chamber;
a lower chamber;
a plate;
a shaft; and
an inlet seal;
wherein:
  said upper chamber is fluidly connectable to a pressurized fluid source;
  said lower chamber comprises an inlet and an outlet;
  said plate is vertically moveable and is disposed between said upper chamber and said lower chamber;
  said shaft connects said plate to said inlet seal and provides a fixed distance there between;
  said inlet seal comprises a substantially conically shaped exterior surface and said inlet comprises a beveled surface;
  positioning of said inlet seal in a lowest position provides sealing engagement of said inlet seal with said inlet;
  internal fluid pressure within said upper chamber biases said plate, and therefore said inlet seal, via said shaft, downward;
  upward vertical movement of said inlet seal from said lowest position disengages said inlet seal from sealing engagement thereof with said inlet; and
  external fluid pressure sufficient to cause upward vertical movement of said inlet seal and disengage said inlet seal from said inlet provides for relief of said external fluid pressure via said inlet through said lower chamber outlet;
providing a pressurized fluid source in fluid communication with the interior of said upper chamber; and
providing a fluid source in fluid communication with at least a portion of a bottom surface of said inlet seal.
15. The method of claim 14, wherein:
said fluid source comprises sulfur.
16. The method of claim 14, wherein:
said plate is disposed within a plate support.
17. The method of claim 14, wherein:
at least one of said plate and said inlet seal comprises an o-ring.
18. The method of claim 14, further comprising:
controlling the temperature of at least a portion of said apparatus.

* * * * *